United States Patent [19]

Thompson

[11] 4,202,221
[45] May 13, 1980

[54] INDEXING APPARATUS

[75] Inventor: Daniel T. Thompson, Pacific Palisades, Calif.

[73] Assignee: Thompson Bagel Machine Manufacturing Corp., Los Angeles, Calif.

[21] Appl. No.: 949,042

[22] Filed: Oct. 6, 1978

[51] Int. Cl.² .................................................. B23Q 17/00
[52] U.S. Cl. ............................................... 74/821; 74/827
[58] Field of Search ................ 74/827, 817, 821, 822, 74/813 R

[56] References Cited

U.S. PATENT DOCUMENTS

| | | | |
|---|---|---|---|
| 3,385,137 | 5/1968 | Barden | 74/822 |
| 3,406,595 | 10/1968 | Tullis | 74/822 |
| 3,598,000 | 8/1971 | Meissner | 74/822 |

OTHER PUBLICATIONS

Western Electric Technical Digest No. 42, Apr. 1976, "Adjustable Precision Index Mechanism", B. L. Koppenhauer et al, pp. 25, 26.

Primary Examiner—Kenneth Dorner
Attorney, Agent, or Firm—Poms, Smith, Lande & Rose

[57] ABSTRACT

Indexing apparatus is disclosed whereby a constantly rotating drive shaft can intermittently drive apparatus driven thereby. An arm carried by the drive shaft pivotally carries a second arm which has means for engaging a cammed surface whereby the pivoted arm is moved radially toward and away from the drive shaft. The rotated output member is mounted for rotation about the longitudinal axis of the drive shaft and includes a projection adapted to be engaged selectively by an engaging member on the pivoted arm as the pivoted arm is rotated in response to the positioning of the camming surface. In the preferred embodiment, the projection is an extended member and the engaging member is initially brought into contact close adjacent the drive shaft and moved radially outward in a decreasing amount whereby the rotated member is smoothly accelerated. Correspondingly, upon disengagement, the engaging member is moved radially outward in an increasing amount to smoothly decelerate the rotated member.

12 Claims, 14 Drawing Figures

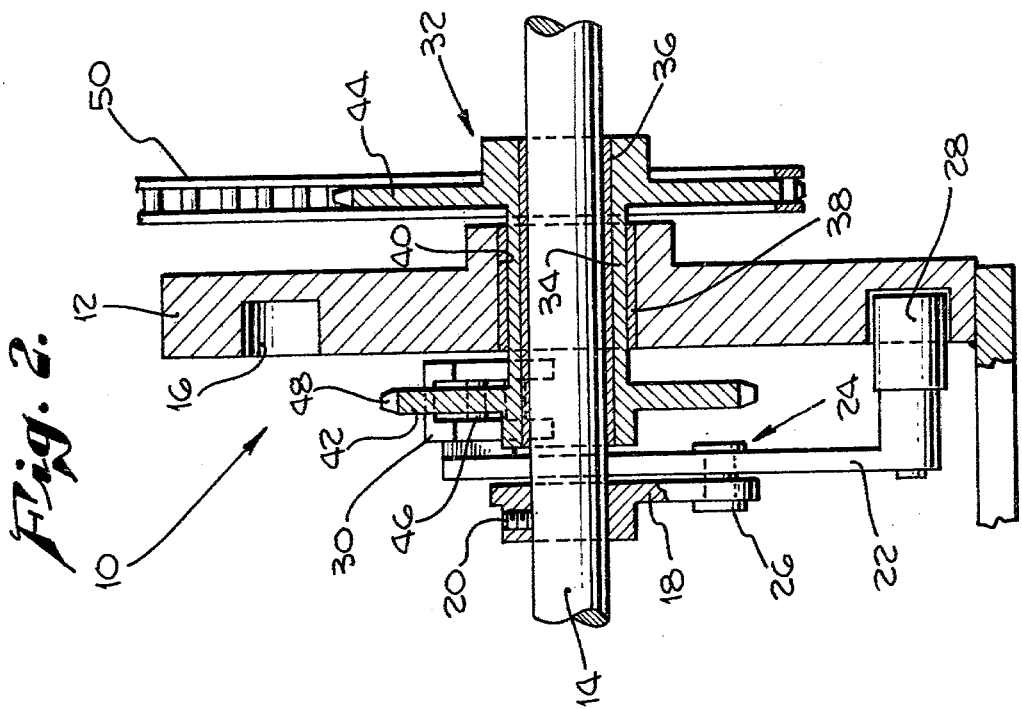
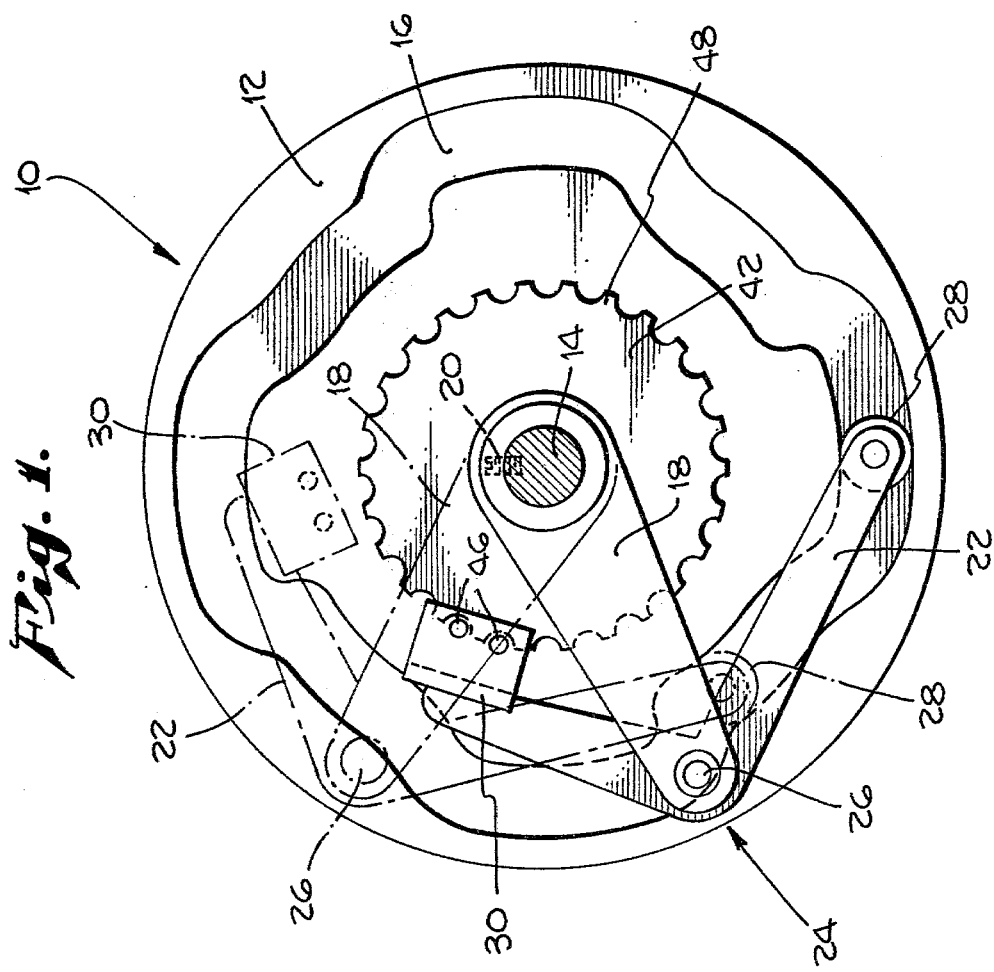

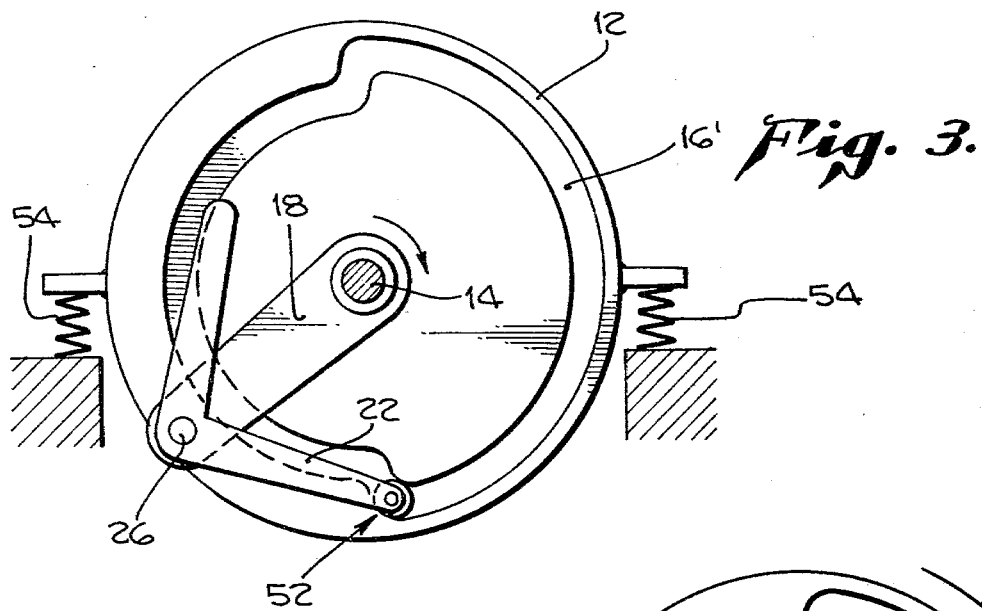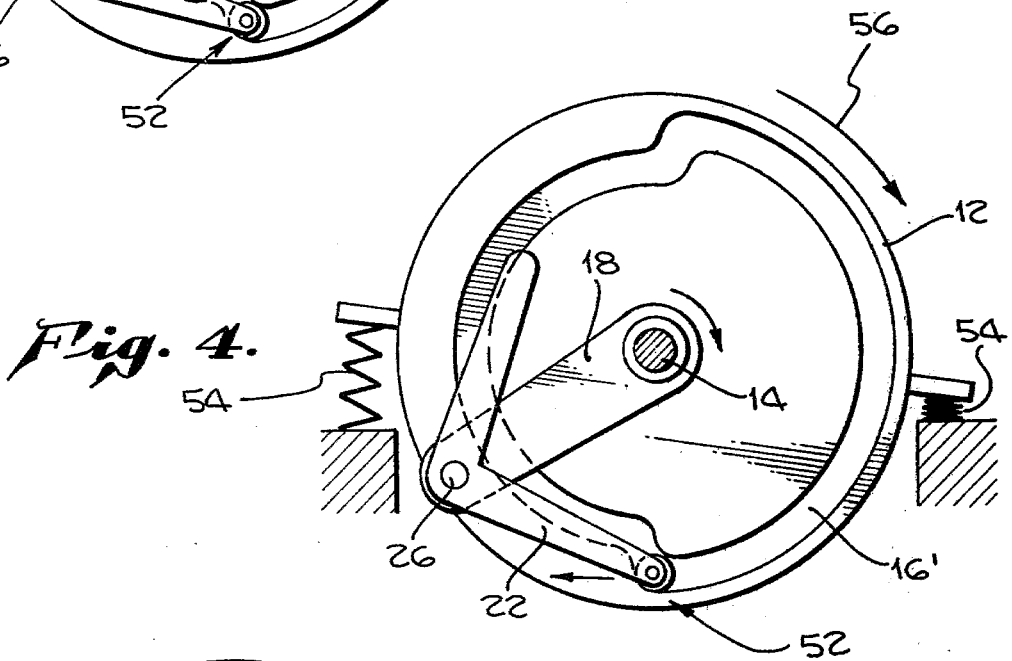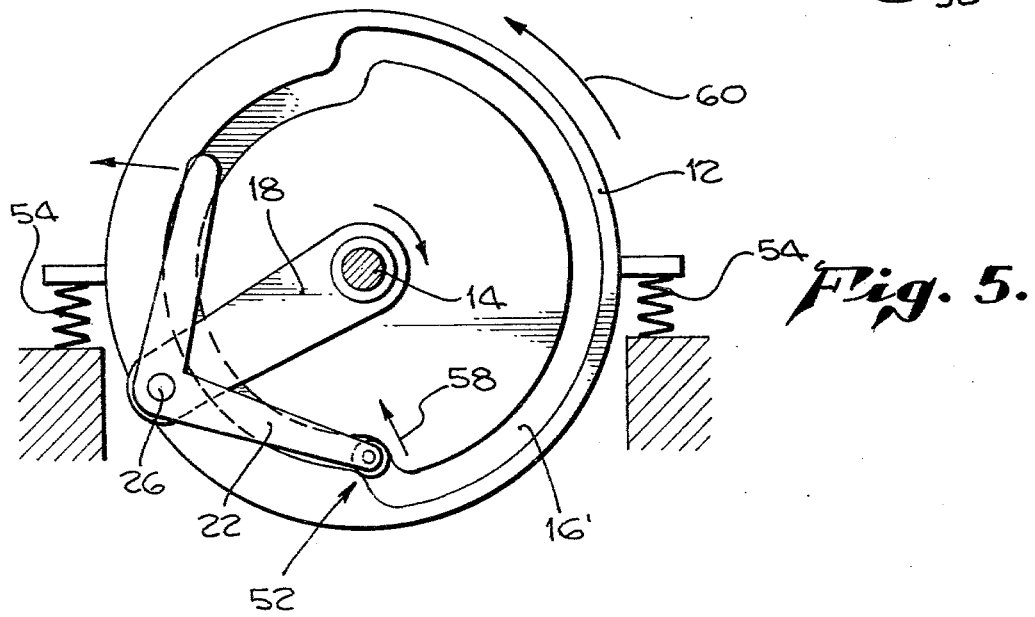

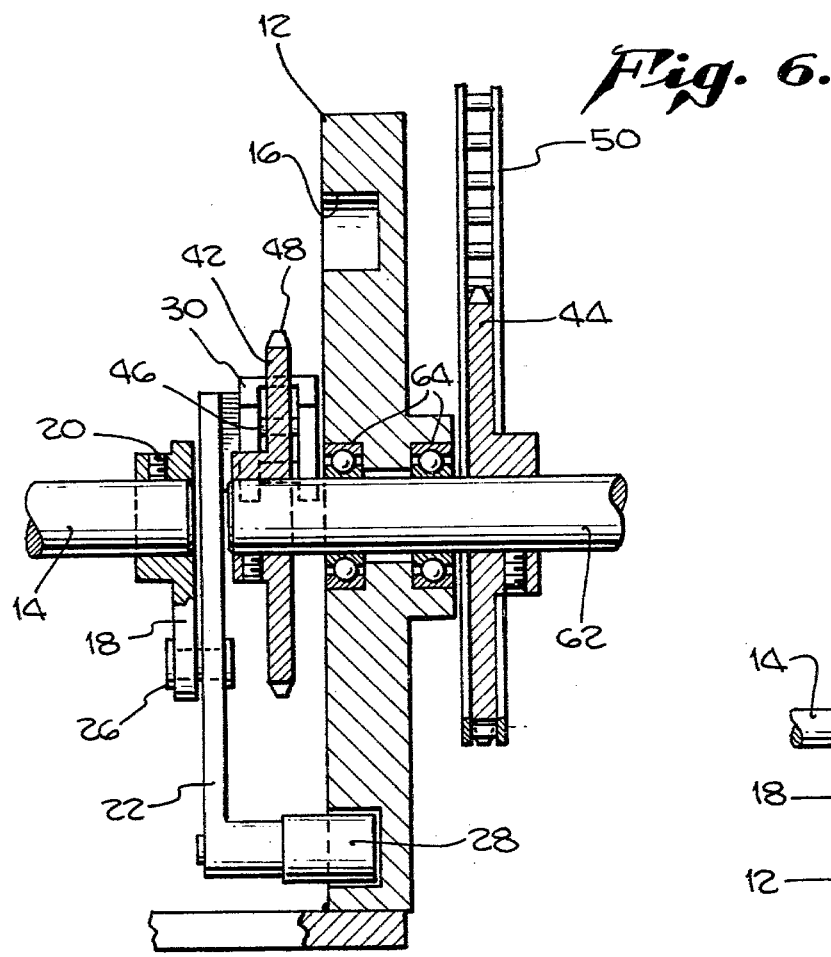
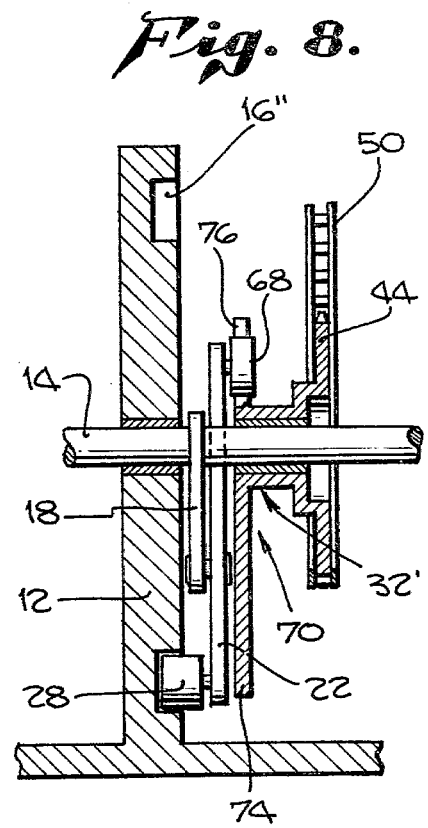
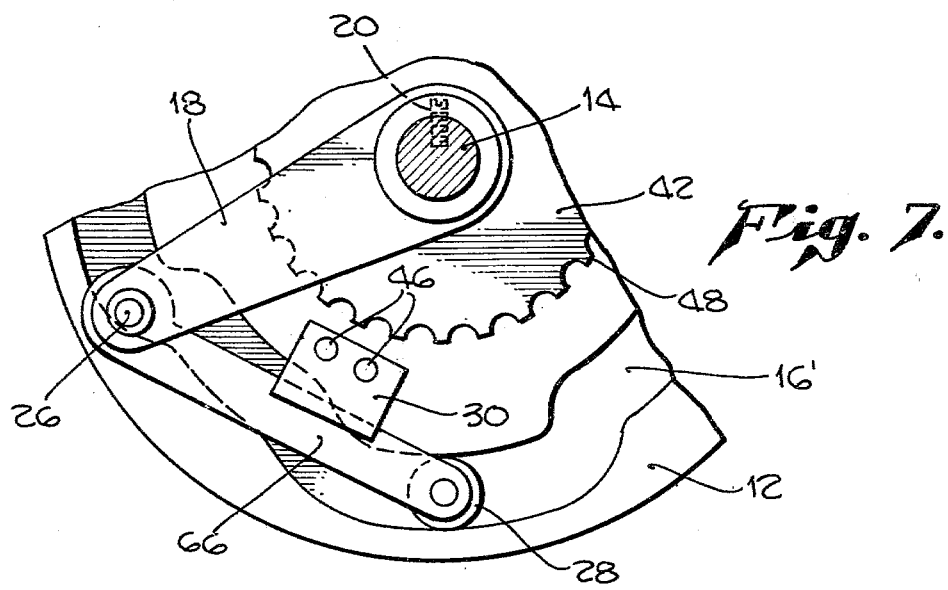

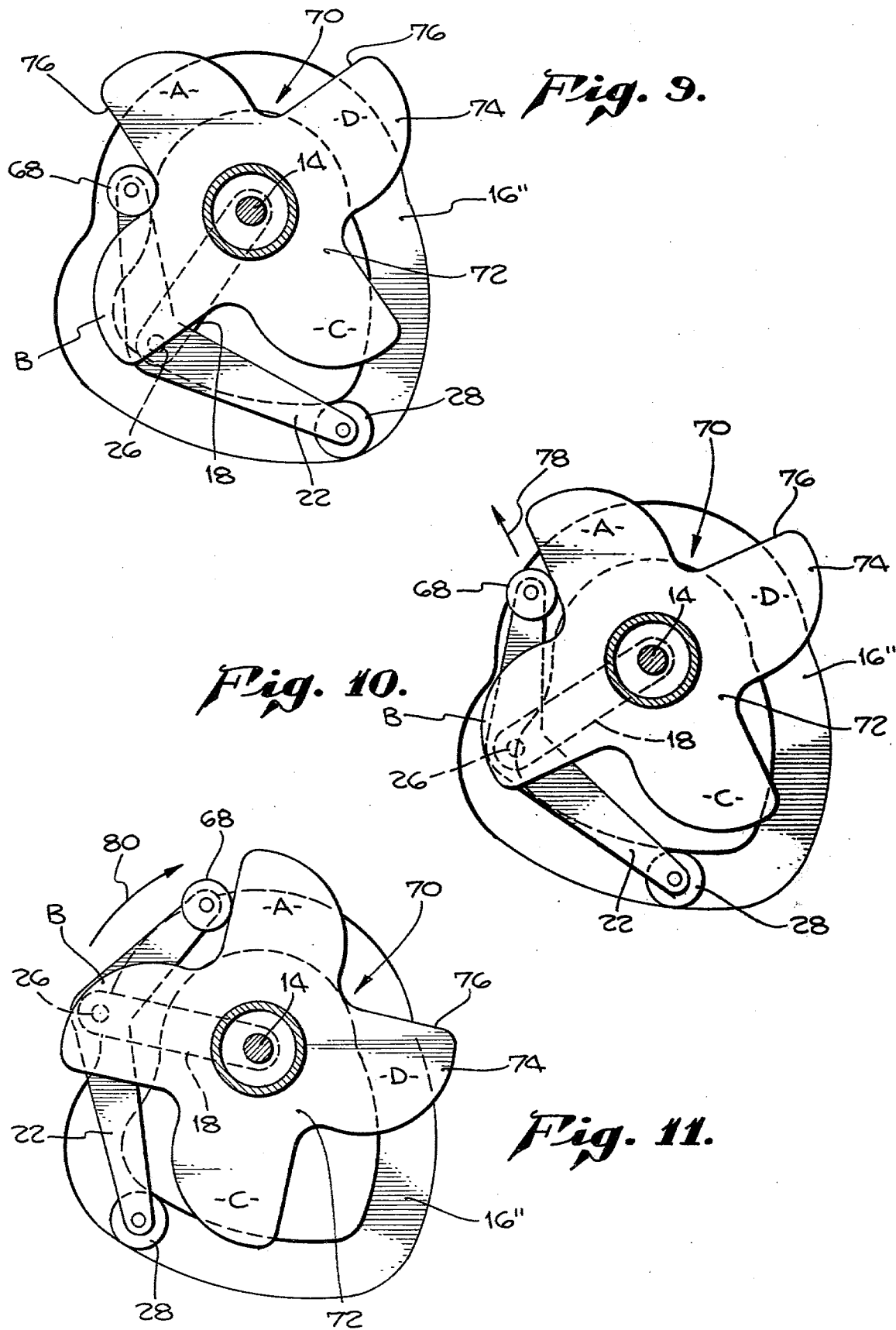

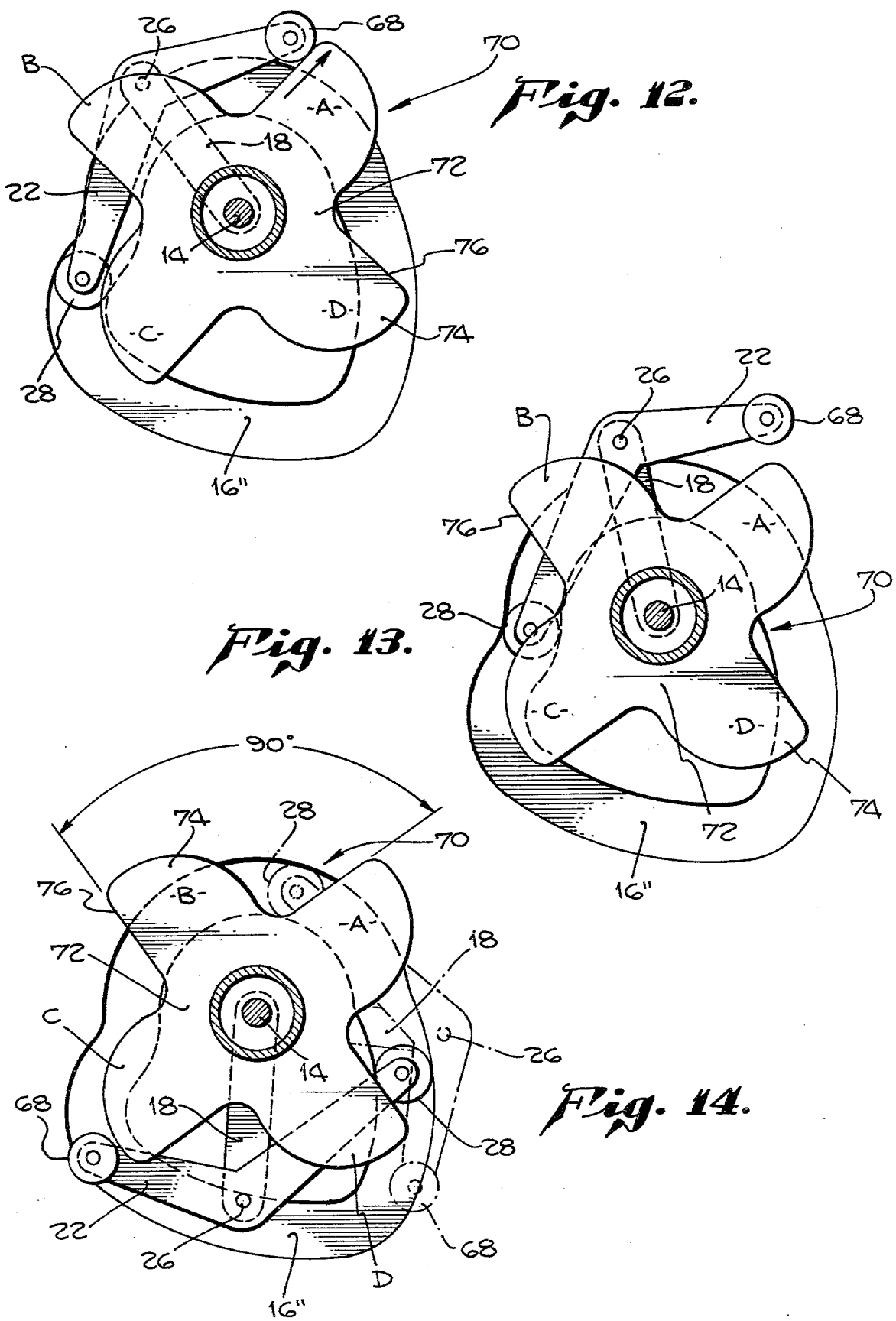

INDEXING APPARATUS

BACKGROUND OF THE INVENTION

The present invention relates to indexing apparatus and more particularly to indexing apparatus whereby a constantly rotating drive shaft selectively drives an output member through the indexing apparatus.

In various types of machinery, it is necessary to rotate a member through a preselected number of degrees of rotation. This is normally accomplished by apparatus generally referred to as indexing apparatus. In one type of such apparatus, a constantly rotating drive shaft drives the indexing apparatus which is, in turn, connected to a driven apparatus. The indexing apparatus causes the driven apparatus to be selectively moved at periodic intervals through the desired movement in response to the constantly rotating input from the drive shaft.

Often, such apparatus is cumbersome and not easily adapted to incorporation in previously constructed apparatus. Typically, the apparatus also sharply engages the output drive and, correspondingly, sharply drops the output drive with no gradual acceleration or deceleration thereof.

Wherefore, it is an object of the present invention to provide an indexing apparatus which is simple and compact.

It is a further object of the present invention to provide indexing apparatus which can be added to a constantly rotating shaft of existing machinery.

It is yet another object of the present invention to provide indexing apparatus which allows smooth acceleration and/or deceleration of the driven member upon engagement and disengagement of the indexing apparatus with the constantly rotating drive input.

SUMMARY

The foregoing objectives have been met by the indexing apparatus of the present invention driven by a rotating drive shaft comprising a guide member having a camming surface disposed about the drive shaft; a rotated member mounted for rotation about an axis passing longitudinally through the drive shaft, the rotated member being the output of the indexing apparatus and being adapted to operably connect to and drive apparatus driven thereby; a driving arm connected on one end to the drive shaft and extending radially therefrom for a rotation therewith; and, an engaging arm rotatably connected to the other end of the driving arm for rotation between an engaged position and a retracted position, the engaging arm having means for engaging and rotating the rotated member when the engaging arm is in the engaged position and for releasing the rotated member when the engaging arm is in the retract position, the engaging arm further having cam follower means for engaging the camming surface to rotate the engaging arm between the positions as a function of the camming surface configuration.

In the preferred embodiment, the rotated member has a radially extended surface; the means for engaging and rotating the rotated member comprises means for engaging the radially extended surface at points along the length thereof or passing over the surface; and, the camming surface is disposed to cause the surface engaging means to initially engage the surface adjacent the rotational axis and move radially outward at a decreasing speed and stop in contact with the surface whereby the rotated member is smoothly accelerated instead of sharply snapped to rotational speed and, additionally, the camming surface is disposed to cause the surface engaging means to disengage the surface by moving radially outward at an increasing speed whereby the rotated member is smoothly decelerated from rotational speed.

DESCRIPTION OF THE DRAWINGS

FIG. 1 is a front elevation of one embodiment of the present invention.

FIG. 2 is a partially cut-away side elevation of the apparatus of FIG. 1.

FIG. 3 is a simplified front elevation of the apparatus of the present invention showing the preferred method of mounting the camming surface to absorb transitional shocks.

FIG. 4 shows in simplified form the rotational aspect of the mounting apparatus of FIG. 3 in response to a rotational force from the cam follower striking a portion of the camming surface defining a rapid radial change in direction.

FIG. 5 shows the apparatus of FIG. 3 and FIG. 4 recovering from the rotational force of FIG. 4.

FIG. 6 is a cut-away side elevation of the apparatus of FIG. 1 showing a second embodiment thereof.

FIG. 7 is a partial front elevation of apparatus of the present invention similar to the embodiment of FIG. 1 showing a possible alternate mounting of the engaging member.

FIG. 8 is a side cut-away elevation of yet another embodiment of the present invention incorporating acceleration and deceleration provisions.

FIGS. 9 through 14 are simplified front elevations of the apparatus of FIG. 8 showing the operation thereof in various stages of engaging, acceleration, constant rotation, deceleration, release, and bypass rotation, respectively.

DESCRIPTION OF THE PREFERRED EMBODIMENT

Referring first to FIGS. 1 and 2, the basic indexing apparatus of the present invention, generally indicated as 10, is shown in a first embodiment. Indexing apparatus 10 comprises a guide member 12 through which the constantly rotating drive shaft 14 passes. Guide member 12 contains a camming groove 16 disposed about the drive shaft 14. A rotated member 18 is attached to the drive shaft 14 as with the set screw 20 to radially project therefrom and rotate in combination therewith. L-shaped driving arm 22 is pivotedly connected to the end of rotated member 18 at the angled junction 24 thereof as with the pivot 26. One end of the L-shaped driving arm 22 is provided with a roller cam follower 28 disposed within the camming groove 16. The opposite end of the L-shaped driving arm 22 is provided with an engaging member 30 which will be described in greater detail hereinafter. As can be seen, as the path of the camming groove 16 extends radially further from the drive shaft 14, roller cam follower 28 tracking therein will rotate the L-shaped driving arm 22 so as to cause the engaging member 30 to move towards the drive shaft 14. Correspondingly, camming groove 16 being disposed closer to the drive shaft 14 will cause the engaging member 30 to move radially away from the drive shaft 14. Thus, by disposing the camming groove 16 radially inward and outward, the engaging member 30 can be made to move, correspondingly, outward and inward.

A rotated member, generally indicated as 32, is mounted concentrically about the drive shaft 14 for rotation about the common longitudinal axis thereof and passes through the guide member 12. Rotated member 32 comprises a central cylindrical portion 34 having an inner cylindrical sleeve bearing 36 between it and the drive shaft 14 and an outer cylindrical sleeve bearing 38 between the exterior thereof and an appropriate bore 40 in the guide member 12. The end of rotated member 32 adjacent the rotated member 18 has a first sprocket 42 and the opposite end of rotated member 32 has a second sprocket 44. As can be seen, engaging member 30 is generally U-shaped and straddles the first sprocket 42. A pair of engaging pins 46 are disposed across the open ends of the U and spaced to engage the distance between the teeth 48 of first sprocket 42. Thus, as roller cam follower 28 moves outwardly as shown in FIG. 1, engaging member 30 is moved inwardly to a point where the engaging pins 46 engage the teeth 48 of first sprocket 42 so that as L-shaped driving arm 22 rotates in combination with rotated member 18, first sprocket 48 is moved in combination therewith. Correspondingly, as the roller cam follower 28 is in the position shown ghosted in FIG. 1, the engaging member 30 is raised to pass over the teeth 48 of first sprocket 42 whereby rotated member 18 is free to rotate while first sprocket 42 remains undriven.

As can be seen and understood from the foregoing, second sprocket 44 is connected to drive the apparatus (not shown) driven by indexing apparatus 10 as by connection with the chain 50 engaging second sprocket 44 (or by substituting a gear or V-belt pulley for second sprocket 44 whereby a gear drive or V-belt drive can be employed).

With the camming groove 16 configured as in FIG. 1, the rotated member 32 is rotated 45° four times and rests for 45° of rotation of drive shaft 14 for each complete revolution of drive shaft 14. It will be understood that other desirable indexing patterns can be achieved by merely modifying the shape of camming groove in its inward and outward radial movement to achieve the desired results.

It should be appreciated from the foregoing description of the embodiment shown in FIGS. 1 and 2 that that embodiment is particularly adapted for concentric mounting on an existing drive shaft to provide an indexed drive therefrom.

Referring now briefly to FIGS. 3–5, a preferred method of mounting the guide member 12 is shown. In these drawings, the camming groove 16' is shown in simplified form. It should be understood from the description which preceded that, if configured as shown in FIGS. 3–5, camming groove 16' would cause alternate driving and passing over of the rotated member (not shown for simplicity in FIGS. 3–5) for each 180° of rotation of drive shaft 14.

For operation of the indexing apparatus of the present invention, the guide member 12 is held against rotation about the drive shaft 14. As the roller cam follower 28 reaches a rapid transition point between the engaged and disengaged positioning of camming groove 16 (as indicated by arrow 52) a sharp rotational force is produced. By mounting guide member 12 on rotational bias members as typified by the springs 54 of FIGS. 3–5, the impact force can be reduced. That is, as the roller cam follower 28 strikes the side of camming groove 16 indicated by arrow 52, guide member 12 is free to rotate about drive shaft 14 to a limited degree as indicated by the arrow 56 in FIG. 4. In so doing, one spring 54 is extended and the other spring 54 is compressed. During the continued movement of L-shaped driving arm 22 in combination with rotated member 18, roller cam follower 28 moves radially inward as shown by the arrow 58 and guide member 28 is rotated back to its normal or "at rest" position of FIG. 3 as indicated by the arrow 60 under the biasing force of springs 54. Ideally, of course, the rotational biasing members indicated in simplified form by the springs 54 would incorporate shock absorbing apparatus to prevent oscillatory motion of the guide member 12 about drive shaft 14.

Referring now to FIG. 6, an alternate embodiment of the present invention as seen in the front elevation of FIG. 1 is shown in cut-away side elevation in FIG. 6. In this embodiment, the drive shaft 14 does not pass entirely through the guide member 12. Rather, the rotated member 18 is mounted on the end of the drive shaft 14 and a driven shaft 62 is mounted concentrically with the longitudinal axis of drive shaft 14. By non-rotatably mounting the first and second sprockets 42, 44 on the driven shaft 62 on either side of guide member 12 and rotatably journalling driven shaft 62 through guide member 12 as by the pair of bearings 64 as shown in FIG. 6, operation substantially identical to that described above with reference to the embodiments of FIG. 1 and FIG. 2 is achieved. That is, as engaging member 30 engages first sprocket 42, first sprocket 42 rotates driven shaft 62 which, in turn, rotates second sprocket 44 to move the chain 50.

Referring now to FIG. 7, an alternate configuration for replacing the L-shaped driving arm 22 of apparatus configured as in FIGS. 1 and 2 or FIGS. 1 and 6 is shown. In this embodiment, the driving arm 66 is pivotally attached to the rotated member 18 with pivot 26 on one end and has the roller cam follower 28 disposed on the opposite end. The engaging member 30 is mounted between the pivot 26 and the roller cam follower 28. Thus, camming groove 16' is disposed within the guide member 12 in direct opposite relation to that previously described. That is, in the use of the L-shaped driving arm 22, camming groove 16 moved radially outward to cause engagement of engaging member 30 with first sprocket 42 and moved radially inward to cause disengagement thereof. When using the driving arm 66 of FIG. 7, the engaging member 30 moves in direct combination with roller cam follower 28 such that camming groove 16 is moved radially inward towards the drive shaft 14 to cause engagement of engaging member 30 with first sprocket 42 and moves radially outward to cause disengagement thereof.

Referring now to FIGS. 8 through 14, a further embodiment of the basic mechanism and modification of elements thereof to achieve the desired acceleration/deceleration objectives is shown. First, whereas the embodiments previously discussed had the first sprocket 42 and second sprocket 44 disposed on opposite sides of the guide member, as can be seen in FIG. 8, it is possible to mount the rotated member 32' wholly on one side of the guide member 12. In some applications, this could afford additional benefits and could be employed with the embodiments hereinbefore described. In the embodiment of FIG. 8, the engaging member 30 has been replaced by an engaging roller 68. Likewise, first sprocket 42 having limited projections in the form of teeth 48 has been replaced by the drive member generally indicated as 70. Drive member 70 comprises a central disc-shaped portion 72 disposed concentrically about drive shaft 14 and having a plurality of extended drive projections 74 extending radially outward therefrom. Each projection 74 has an extended drive surface 76 along the side thereof facing the engaging roller 68. Camming groove 16 is configured to produce the action shown in FIGS. 9 through 14 whereby both acceleration and deceleration are provided in the manner to be described hereinafter. It is to be understood that either acceleration or deceleration alone could be provided by making appropriate modifications to the camming groove 16" as will be apparent from the description which follows. It is to be understood that drive shaft 14 and, correspondingly, rotated member 18 are moving at constant rotational velocity. The projections 74 are labeled A-D for clarity.

Engaging roller 68 is disposed to contact drive surface 76 close adjacent drive shaft 14 as shown in FIG. 9. In moving from the configuration of FIG. 9 to that of FIG. 10, camming groove 16" is configured to move engaging roller 68 radially outward as indicated by the arrow 78 in a decreasing amount whereby drive member 78 has an acceleration force imparted thereto such that at arriving at substantially the midpoint of drive surface 76, engaging roller 68 is no longer moving radially outward but in a concentric path about drive shaft 14 as indicated by the arrow 80 of FIG. 11. That is, having achieved acceleration to operational rotational speed, engaging roller 68 rotates about drive shaft 14 in direct combination with rotated member 18.

Upon arriving at the position shown in FIG. 12, camming groove 16" is configured to move engaging roller 68 radially outward at an increasing rate causing drive member 70 to be decelerated until the clearance position of FIG. 13 is achieved. That is, engaging roller 68 is moved beyond the end of the drive surface 76 and, in fact, beyond the extended drive projections 74 wherein it is free to pass over projections 74 as it moves from the position of FIG. 13 through the positions of FIG. 14 and back to the initial contact position of FIG. 9 with the next adjacent projection 74 from that just driven. Thus, it can be seen that the configuration shown in FIGS. 9 through 14 will cause drive shaft 14 to be accelerated, constantly driven, and decelerated for 45 degrees of rotation of second sprocket 44 for each 360 degrees of rotation of drive shaft 14 with the remaining 270 degrees of rotation drive shaft 14 being undriven.

Typically, in indexing apparatus heretofore, such acceleration and deceleration was achieved by rotating the drive shaft 14 in a non-constant manner. That is, an elliptical drive, or the like, is employed to slow and speed up the drive shaft 14 to achieve the acceleration and deceleration with respect to the output (e.g. second sprocket 44). It should be appreciated that the apparatus of the present invention as just described with reference to FIGS. 9 through 14 allows for acceleration and deceleration with a constantly moving drive shaft 14. This is of particular importance where an indexing drive is desired to be added to an existing constantly rotating drive shaft as is possible with the apparatus of the present invention.

It should be appreciated that the apparatus of the present invention is particularly adapted for mounting in tandem on a common shaft or longitudinal axis to provide a complex ultimate output.

Wherefore, having thus described my invention, I claim:

1. Indexing apparatus driven by a rotating drive shaft comprising:

(a) a guide member having a camming surface disposed about the drive shaft;
(b) a rotated member mounted for rotation about an axis passing longitudinally through the drive shaft, said rotated member being the output of the indexing apparatus and being adapted to operably connect to and drive apparatus driven thereby;
(c) a driving arm connected on one end to the drive shaft and extending radially therefrom for rotation therewith; and,
(d) an engaging arm rotatably connected to the other end of said driving arm for rotation between an engaged position and a retracted position, said engaging arm having means for engaging and rotating said rotated member when said engaging arm is in said engaged position and for releasing said rotated member when said engaging arm is in said retracted position, said engaging arm further having cam follower means for engaging said camming surface to rotate said engaging arm between said positions as a function of said camming surface configuration.

2. The indexing apparatus of claim 1 wherein: said guide member is mounted for rotation about the drive shaft and held in an at-rest position by bias means for allowing said guide member to rotate slightly from said at-rest position and return thereto in response to rotational forces from said cam follower means meeting a rapid radial transition in said camming surface.

3. The indexing apparatus of claim 1 wherein:
(a) said rotated member has a plurality of radially spaced projections;
(b) said means for engaging and rotating said rotated member comprises means for engaging or passing over said projections; and,
(c) said camming surface is disposed to cause said engaging means to engage only one of said projections for less than 360° of rotation during 360° of rotation of the drive shaft.

4. The indexing apparatus of claim 1 wherein:
(a) said rotated member has a radially extended surface;
(b) said means for engaging and rotating said rotated member comprises means for engaging said radially extended surface at points along the length thereof or passing over said surface; and,
(c) said camming surface is disposed to cause said surface engaging means to initially engage said surface adjacent said rotational axis and move radially outward at a decreasing speed and stop in contact with said surface whereby said rotated member is smoothly accelerated instead of sharply snapped to rotational speed.

5. The indexing apparatus of claim 1 wherein:
(a) said rotated member has a radially extended surface;
(b) said means for engaging and rotating said rotated member comprises means for engaging said radially extended surface at points along the length thereof or passing over said surface; and,
(c) said camming surface is disposed to cause said surface engaging means to disengage said surface by moving radially outward at an increasing speed whereby said rotated member is smoothly decelerated from rotational speed.

6. Intermittent output apparatus driven by a rotated drive shaft comprising:

(a) a first arm connected on one end to the drive shaft projecting radially therefrom for rotation in combination therewith;

(b) a camming plate mounted normal to the longitudinal axis of the drive shaft in spaced relationship to said first arm and having a camming groove therein disposed about said axis;

(c) a second arm pivotally mounted to said first arm and having a cam follower disposed in said camming groove to pivot said second arm in response to changes in the positioning of said camming groove as said first arm and said second arm rotate in combination with the drive shaft;

(d) a rotatable output member mounted for rotation about the longitudinal axis of the drive shaft and having a projecting member radially projecting therefrom, said output member further having means for engaging and driving apparatus driven by the intermittent output apparatus as said output member is rotated; and, (e) an engaging member carried by said second arm for selectively engaging said projecting member to rotate said rotatable output member and disengaging said projecting member, said camming groove being configured to move said engaging member into engagement and disengagement by pivoting said second arm at preselected points in the rotation of the drive shaft to provide the desired intermittent rotation of said rotatable output member.

7. The intermittent output apparatus of claim 6 wherein:
said rotatable output member has a plurality of said projecting members spaced radially thereabout.

8. The intermittent output apparatus of claim 6 wherein:
(a) said camming plate has a bore therethrough through which the drive shaft passes; and,
(b) said rotatable output member is rotatably mounted on the drive shaft.

9. The intermittent output apparatus of claim 8 wherein:
(a) said projecting member is disposed on one side of said camming plate; and, (b) said driven apparatus engaging means is disposed on the other side of said camming plate.

10. The intermittent output apparatus of claim 6 wherein:
(a) said projecting member is an elongated member;
(b) said engaging member is adapted to be moved by said second arm continuously along said elongated projecting member in driving relationship therewith to a position beyond the end thereof to pass thereover in non-driving relationship therewith; and,
(c) said camming groove is configured to initiate engagement of said projecting member by said engaging member adjacent the drive shaft pivoting said second arm to move said engaging member radially outward at a decreasing rate and stopping at substantially the midpoint of said projecting member whereby said rotatable output member is smoothly accelerated to full rotational speed.

11. The intermittent output apparatus of claim 10 wherein additionally:
said camming groove is configured to disengage said projecting member by said engaging member by pivoting said second arm to move said engaging member radially outward at an increasing rate toward said position beyond the end of said projecting member such that said rotatable output member is smoothly decelerated during disengagement.

12. The intermittent output apparatus of claim 10 wherein:
(a) said rotatable output member has at least three of said elongated projecting members radially spaced thereabout; and,
(b) said camming groove is configured to move said engaging member into engagement with one of said projecting members and rotate said rotatable output member for less than 360° then disengage from said one projecting member, pass over the next sequential of said projecting members, engage the projecting member preceding said one projecting member, and repeat the same procedure for said preceding member whereby said rotatable output member is rotated for less than 360° for each 360° of rotation of the drive shaft.

* * * * *